United States Patent [19]

Poarch

[11] 4,202,907
[45] May 13, 1980

[54] SAUSAGE PRODUCTS HAVING IMPROVED PHYSICAL PROPERTIES AND METHOD OF PRODUCING THE SAME

[76] Inventor: Arthur E. Poarch, 5104 Monterey St., Carmel, Calif. 93921

[21] Appl. No.: 927,022

[22] Filed: Jul. 24, 1978

Related U.S. Application Data

[63] Continuation of Ser. No. 776,299, Mar. 10, 1977, abandoned.

[51] Int. Cl.$^2$ .......................... A23C 9/12; A23C 9/14
[52] U.S. Cl. ......................................... 426/34; 426/36; 426/42; 426/573; 260/119; 426/646; 426/588
[58] Field of Search ..................... 426/36, 56, 573, 34, 426/35, 42, 656, 646, 588; 260/119

[56] References Cited

U.S. PATENT DOCUMENTS

| 1,624,154 | 4/1927 | Winckel | 426/34 |
| 2,928,742 | 3/1960 | Kennedy et al. | 426/42 |
| 3,050,400 | 8/1962 | Poarch et al. | 426/646 |
| 3,179,521 | 4/1965 | Poarch | 426/646 |
| 3,399,065 | 8/1968 | Wistreich et al. | 426/42 |

OTHER PUBLICATIONS

Lincoln M. Lampert, Modern Dairy Products, Chemical Publishing Company, Inc. 1965, pp. 200-201.

Primary Examiner—Raymond N. Jones
Assistant Examiner—Robert J. Warden

[57] ABSTRACT

Non-reversible gels are formed in sausage and meatball products during cooking by the reaction of enzyme activated sodium caseinate and calcium ion to provide such products with improved organoleptic and other physical properties.

9 Claims, No Drawings

SAUSAGE PRODUCTS HAVING IMPROVED PHYSICAL PROPERTIES AND METHOD OF PRODUCING THE SAME

This application is a continuation of my co-pending application, Ser. No. 776,299, filed Mar. 10, 1977, now abandoned.

SUMMARY OF THE INVENTION

This invention relates to the preparation of cooked comminuted meat products comprising meat, meat by-products, fat, cereals, water, dried milk products, sugars, salt, curing compounds and flavors or spices. These cooked comminuted meat products appear in commerce as frankfurters, balogna, salami, liver sausage and loaf products. They may or may not be enclosed in natural casing materials. These cooked comminuted meat products also include meatballs or sausages which are either cooked or uncooked, formed into a shape, placed in containers with water, broth or gravy, the can closed and followed by heat processing.

An object of this invention is to provide cooked comminuted meat products that have improved organoleptic properties, retain more included moisture and fat and/or have a firmer texture than products of similar nature that are now commercially manufactured.

A further object of this invention is to provide a method whereby such meat products having such improved physical properties may be made.

DETAILED DESCRIPTION

For purposes of simplifying the following description, the term "sausage" relates to frankfurters, bologna, salami, loaves and the like. These are not heat processed in a can or jar but are produced by cooking them in a casing or loaf pan. The casing may be removed or left in place and the loaf products are removed from the container in which they are cooked, usually sliced and then packaged for sale. The term "meatballs" relates to mixtures of comminuted or finely ground meats, meat by-products, cereals, milk products, flavors and curing compounds that are either shaped and cooked or shaped uncooked and placed in a closed container with broth, gravy, sauce or water and then heat processed. The term "meatball" includes vienna sausage, cocktail sausage, canned tomales, meatballs and the like. It also includes such products as meat spreads made from ham, beef by-products, poultry meats or the like that may contain all or part of the above mentioned additives and which are not necessarily preformed but are placed in a closed container in a compact state and subjected to heat processing.

This invention does not relate to sausages which are marketed in the raw uncooked state.

It is well known in the trade that water soluble proteins play an important part in the proper preparation of good sausages. Meats contain the protein "myosin" which is soluble in brine. When meats are comminuted in the presence of water and salt, the myosin dissolves in the brine. The resulting protein solution coats the meat fibres and the comminuted fats to help form a dispersion of these components and a stable emulsion or batter. When this batter is formed and heat processed, the myosin along with other heat sensitive meat proteins, sets to a solid, gelled or semi-solid condition. The fat, moisture, meat particles and other ingredients are fixed in a more or less immovable position. The shaped batter becomes semi-rigid and thusly a "sausage" is produced.

The amount of myosin that is present in the brine of a sausage batter depends on a variety of conditions, i.e. the amount of muscle meat in the formulation, the amount of salt present, the degree of comminution of the meat and the temperature of the comminuting and extraction processes. Time is an important factor in the process of extracting the maximum amount of myosin from the meat and the subsequent coating of the comminuted meat and fat particles with the myosin-brine solution. That is to say the extraction and coating process requires time and is not accomplished in an instant.

In recent years, high speed comminuting machines have come into use to make sausage batters. These processors reduce roughly ground meats and the other sausage ingredients to a batter in a fraction of a second. The cutter-chopper system that has been and still is used in the conventional process of reducing ground meats to a batter requires as much as 15 minutes to accomplish the same meat and fat particle size reductions. It is believed, by some in the trade, that better sausages are made by the slower cutter-chopper system than when the high speed comminuting machines are used. It is reasoned that the high speed machines do not allow sufficient time for maximum myosin extraction to occur and the subsequent even coating of the fat and meat fiber particles with the desirable protective and functional myosin protein solution.

Various means are used to increase the amount of protective coating material present in a sausage formulation before the process of comminution is accomplished. The trade uses water soluble natural or synthetic gums, solubilized soya proteins, sodium caseinate, calcium reduced dried skim milk and the like as sources of emulsion protective ingredients. Applicant's issued U.S. Pat. Nos. 3,050,400 and 3,179,521 disclose two systems that apply to the problem of supplying additional soluble protein for building a more stable emulsion system.

Each of the above mentioned ingredients only partly functions to augment the effect of maximum soluble myosin protein in the sausage batters. All of these products are good emulsion protective materials but they remain water soluble at the elevated temperatures used to cook the sausage batter. While they may exhibit high viscosity or semi-gel forming characteristics at temperatures encountered in the chopper or high speed comminuters, they lose their high viscosity or gel forming ability at the cooking temperatures necessary to convert the sausage batters to a semi-rigid final form. At the cooking temperatures, the fat has changed from a solid to a liquid state and the water is more mobile than at chopper temperatures. It is usually at the cooking temperatures that the sausage maker learns if the formula contained sufficient gel forming and emulsion protective ingredients to prevent excess moisture loss or migration of the liquid fat to an undesirable location.

It will be appreciated from the foregoing that an ingredient which has excellent emulsion building characteristics at chopper or processor temperatures and which also has irreversible gel forming or setting abilities at sausage cooking temperatures would be highly desirable and that it would make better sausages. A new modified milk product having these characteristics and abilities is hereinafter described.

The enzyme rennin when extracted from calves' stomachs is called rennet. When rennet is added to fresh milk, within a controlled temperature range and for a period of time, the rennet attacks the casein protein of the milk and a curd is formed. It is this process that is the basis for the production of many cheeses. This curd forming or clotting action on milk is not confined to rennet alone. A wide variety of enzymes such as those derived from bacteria and fungi sources have similar if not identical properties. The literature lists at least 100 enzymes that will clot milk. For purposes of this discussion, the action of rennet will be illustrated. However, it is to be understood that other enzymes singly or in combination may be used in place of rennet to obtain similar results. Calf rennet is the classic standard against which fungal and microbial rennets are evaluated. Enzymes which appear to be desirable to produce the described product because they possess "milk clotting" characteristics may be undesirable because they unduly hydrolyze the total milk protein. The enzyme derived from *MUCOR MIEHEI* ("Fromase" Wallerstein) is similar to rennet. Pepsin as extracted from pig stomachs has both milk clotting and hydrolyzing actions. Other enzymes as derived from a variety of sources may be applicable to the production of the described product. The choice of single or multiple mixtures of enzymes should be such that the preparation has a high clotting action on milk without excessively hydrolyzing the milk protein.

Calcium is a natural ingredient of milk. Calcium is present in market milk as calcium lactate, calcium chloride, calcium citrate, and is also loosely bound to the casein protein as a calcium-phospho-casein complex.

The detailed chemical action of rennet on milk to form clots or curds is not entirely understood. However, it appears that rennet has a specific style of protein splitting action on the casein in milk. The split fragments or activated terminal ends of the rennet treated casein molecules are highly reactive to the calcium in the milk. The new chemical combination that is commonly called curds is different than the casein-calcium combination that exists in untreated milk. The curds, when separated from the whey of rennet clotted milk, contain a major portion of all of the calcium that was present in the milk. The dried curds from rennet clotted milk are commercially marketed as rennet casein.

Rennet activated casein in milk will also react with multivalent metal ions other than calcium. Some of these multivalent metal ions are present in milk but to a minor degree compared to calcium. One of these is magnesium; however, for purposes of describing the present invention, only calcium will be considered. Other multivalent metal ions might also be used to produce the product, but, for practical economic reasons, the preferred metal ion to be used is calcium.

The cation exchange treatment of milk to replace the multivalent ions therein with sodium ions is described in U.S. Pat. No. 3,050,400. The exchange process converts the calcium-phospho-caseinate complex of milk to sodium caseinate. Calcium-phospho-caseinate in milk is not soluble in water and therefore milk is an opaque fluid. The calcium-phospho-caseinate in fluid milk is, in fact, dispersed as small suspended particles of solid matter. Sodium caseinate, on the other hand, as produced when the sodium-for-calcium exchange occurs, is soluble in water. A sodium-for calcium exchanged skim milk is hazy and semi-transparent to light passage. When dried it is commercially marketed as calcium reduced dried skim milk. This product is currently used by the sausage industry at a multimillion pound annual volume.

When rennet enzyme is caused to act on sodium-for-calcium exchanged milk under certain circumstances, the low calcium skim milk is altered. The alteration is not apparent to the eye since no clotting occurs. However, the enzyme treated ion exchanged milk is chemically different and is very sensitive to calcium ion addition plus the application of heat to form a gel structure. When calcium is added to a solution of calcium reduced dried skim milk and the mixture is heated, a white opaque milk-like fluid results but no gel formation occurs. Calcium ions may be added to the solution of enzyme treated low calcium milk at low temperatures without the formation of curds or a gel. However when the mixture is heated to temperatures used to cook sausages, a firm, rigid non-reversible gel is formed. When the gel structure is cooled, even to refrigerator temperatures, the gel remains firm and intact.

The characteristics of the special gel formed by the reaction of enzyme treated low calcium milk and calcium are quite different than those of the regular gels formed by concentrated solutions of gums, vegetable proteins, starches, water soluble milk proteins or animal gelatins as they each may be used as sausage ingredients. The special gels of this invention are "brittle" in nature as opposed to the elastic or rubbery and plastic texture of the regular gels. This is of particular significance in the manufacture of firm but still succulent meat products such as frankfurters and meatballs and when the described product is a component of canned meat spreads.

The gel structure described herein, when it is a component of cooked comminuted meat products, is quite effective in its ability to retain fat and moisture within the body of the cooked product whether or not it is warmed before it is eaten. In addition, the formed gel increases the firmness of the meat product in its cooked form. However, when the meat product is mechanically distorted to a major degree such as in the act of chewing the meat product, the formed gel easily fractures with very little resistance. On the other hand, the regular gels, or highly viscous solutions that resemble gels such as result from the use of gelatins, gums, concentrated proteins and the like in sausage, more or less retain their elastic, plastic or rubbery characteristics at lower temperatures but become sticky solutions when the sausage is heated to eating temperatures and either are inclined to interfere with the succulence of the sausage or leave a coated sensation on the tongue.

A solution of the dried enzyme treated low calcium milk with or without calcium present is an excellent emulsifying aid to protect the cold comminuted fat particles in a sausage batter from clumping to form an incipiently unstable emulsion. Since the solution of treated low calcium milk and a calcium source is fluid at the temperatures used to chop or comminute the meats in sausage manufacture, each meat particle of the sausage batter will be coated with a thin film of protective protein-containing solution which serves as an adhesive to hold the meat particles together when the sausage is cooked and the heat-sensitive protein solution forms a rigid gel.

The addition of this heat-sensitive protein solution to sausage formulations augments the amount of myosin protein that has been extracted from the meat by the brine constituent of the sausage batter. The combination of these two protein solutions as protective colloids produces a firmer, more stable and better tasting sausage product.

The addition of a combination of enzyme treated low calcium skim milk product and calcium to meat combinations, which are later compacted into a container which is closed and heated, will cause the formation of a gel. This will help trap the fat and moisture within the cooked mass and minimize the separation of fat from the body of the spread. Thus the unsightly accumulation of fat that often appears under the lid of meat spread containers is minimized or eliminated.

One of the problems encountered by manufacturers of meatballs, vienna sausage, cocktail sausages, tomales, and similar products, which are formed to definite shapes, suspended in broth, water, sauce or gravy, and cooked within a closed container, is the rendering of the fat from the meatballs and the migration of this fat to the surface of the fluid medium in which the meatballs are cooked. The loss of fat from the meatballs and its accumulation on interior surfaces of the can is not only unsightly but the loss of fat from the meatballs reduces their size and makes them tough organoleptically.

Formed meat roducts that are to be further heat processed after canning may be shaped from raw ingredients, added to the broth, and cooked by performing the entire cooking step after the container is closed. Often the meat balls are shaped from raw ingredients, preliminarily cooked only sufficiently for them to hold their shape, or fully cooked, then placed in the container with the broth, the container closed and additional heat processing performed.

The rendering of fat from the canned meatballs can be minimized or eliminated by using the following procedure.

Enzyme treated low calcium skim milk solids are incorporated into the formula for the meatballs. A calcium ion source is added to the broth medium in which the meatballs are to be suspended and cooked. The meatballs and broth are combined, the container closed and heat processed.

During the heat processing of the closed container, the calcium ions in the broth penetrate the meatballs, react with the calcium sensitive protein of the enzyme treated low calcium skim milk component and form a gel within the body of the meatballs. This gel serves to cement the meat particles together, to hold the fat within the meatballs, and, since the gel is aqueous, to retain moisture in the meatballs. The result is the production of meatballs which contain more fat, more water, are plumper and have better organoleptic properties than meatballs from which fat has been rendered and which contain less moisture. The retention of the fat within the meatballs naturally results in less fat rendering to the broth medium and less fat accumulation on the surface of the broth.

A greater or lesser fraction of the total calcium used may be incorporated in the meatballs before cooking them in the broth, with additional calcium being added as an ingredient of the broth, gravy or sauce. This may be desirable when the meatballs are preprocessed with heat before they are cooked with the broth in a container. This provides an advantage by the production of a firmer product that is less inclined to physical fracture during the subsequent final assembly and cooking procedures.

Meatballs made entirely from a fully comminuted batter may not be preferred depending upon a manufacturer's desires. The preparation of meatballs may be divided into two stages. In the first stage, meats may be ground to a degree wherein the meat retains some physical identity; for example, twice through a 3/16 inch grinder plate. The balance of the formula including the enzyme treated low calcium milk product, high fat meat ingredients, spices, flavors and cures, may be reduced to a batter in a chopper or high speed comminuter. The ground lean meats are then thoroughly mixed with the batter and the combination formed into meatballs. These modified meatballs are placed in the can with the broth that contains the calcium, the can closed and heat processed. The resulting product will consist of discrete meat pieces surrounded by a firm matrix of coagulated batter. These meatballs will have a different and possibly a more pleasing texture than those which are made entirely from finely comminuted ingredients.

Examples illustrating the methods used to produce the enzyme treated low calcium skim milk product, the sausage products made incorporating the milk product, and the properties of such sausage products are hereinafter set forth.

MILK PRODUCT PREPARATION

Fresh fluid skim milk is the desirable primary material. It may be raw or pasteurized. The latter is preferred since it introduces fewer living bacteria into the subsequent operations. Reconstituted skim milk made from nonfat dry milk and water can be used.

The ion exchange resin material is a high capacity cation type nuclear sulfonic polystyrene resin (Duolite C-20—Diamond Shamrock Corp.) which has been preconditioned with a sodium chloride solution. Similar exchange resins are available from different sources. From experience it has been learned that this particular resin is stable, has long life, and is predictable in performance.

The degree of preconditioning with sodium chloride solution and the rate at which milk passes through the resin bed determines the extent of the sodium for calcium exchange that is accomplished. From the practical viewpoint it is difficult, expensive and unnecessary to remove all of the calcium from the skim milk. However, the quality of the gel resulting from the reaction of calcium ions with the final rennet treated milk product depends to a considerable extent on the calcium content of the exchanged milk.

For purposes of these examples, the calcium ion content of the skim milk which was passed through the ion exchange resin was held to not more than 8 mg. of calcium per 100 ml. of skim milk. A calcium content of 8 mg. or less is preferred but not necessary.

The following table shows the effect of calcium content of the exchanged skim that has been treated with the enzyme and after calcium has been reintroduced to a constant total of 125 mg. per 100 ml. of milk product and the mixture heated.

TABLE A

| Ca Content of Exchanged Skim Milk mg./100 ml. | Appearance of Exchanged Skim after Rennet Treatment | GEL PROPERTIES After Heating to 65°-70° C. with added Calcium. (a)(b) |
| --- | --- | --- |
| 8.0 | Translucent | Tough, Firm Gel |
| 26.2 | Translucent | ↓ |
| 37.3 | Translucent | (Decreasing Firmness) |
| 42.9 | Sl. Milky | ↓ |
| 70.6 | White, Opaque | Tender, Delicate Gel |
| 76.2 | White Opaque | Curdy Gel, Fragmented |
| 81.7 | White Opaque | No Gel, Floc Formation |
| 87.0 | Floc Formation | No Gel, Heavy Curd |

TABLE A-continued

| Ca Content of Exchanged Skim Milk mg./100 ml. | Appearance of Exchanged Skim after Rennet Treatment | GEL PROPERTIES After Heating to 65°-70° C. with added Calcium. (a)(b) |
|---|---|---|
| 92.1 | Curd Formation | — |

(a) Sodium Chloride present as 45% of milk solids content.
(b) Calcium added as calcium lactate solution.

From Table A it is evident that gels are formed when the calcium content of the exchanged skim is between 8 and about 70 mg. per 100 ml. In view of the factors affecting gel formation, it is to be expected that when calcium is present at less than 8 mg./100 ml., gels will be formed.

When a sodium for calcium exchange of this magnitude occurs in skim milk, the milk shifts in pH value from about 6.8 to a pH of 7.4–7.6. As will be discussed later, the preferred pH of the low calcium skim milk for rennet treatment is about 6.5. It becomes necessary to adjust the treated skim milk substrate to attain this pH 6.5 range. This may be accomplished in several ways. Four such methods are as follows:

(1) Precondition the ion exchange resin bed with a mixture of sodium chloride and an acid such as hydrochloric acid.

(2) Add a bacteria culture to the exchanged milk, incubate it and rely on the generation of lactic acid to lower the pH to the desired range.

(3) Pretreat the milk prior to being exchanged by the direct addition of acid or by culturing it with an appropriate bacteria to generate lactic acid in situ. The pH of adjustment should be of sufficient magnitude to compensate for the shift due to exchange and to result in a pH value within the desired range.

(4) By the direct addition of acid to the exchanged milk to shift the pH to the desired range.

The preferred method is (4).

The acid chosen for pH adjustment may be an organic or inorganic acid suitable for human consumption. The anion portion of the acid should have neither a strong flavor nor odor such as acetic acid nor should the acid anion be capable of sequestering calcium, as can occur with phosphoric, tartaric or sulfuric acids.

Either hydrochloric or lactic acid are edible acids and are satisfactory choices for pH adjustment of the exchanged substrate. Of these two, hydrochloric acid is preferred because of its relatively low cost and ready availability.

The preferred procedure is to rapidly agitate the exchanged skim milk and slowly add 1.0 N edible hydrochloric acid to the exchanged milk to a pH 6.5. For example 1 liter of low calcium exchanged fluid skim milk having a pH 7.45 required 14.5 ml. 1.0 N hydrochloric acid to reduce the pH to 6.5. If the agitation of the milk is rapid and the acid is slowly added to avoid momentary local high concentration of acid in the milk, no casein precipitation will occur. The concentration of the acid added to adjust the pH need not be exactly 1.0 N. More concentrated acid may be used if the milk is rapidly agitated and the acid addition slow enough to prevent local casein precipitation.

The enzyme treatment of the acidified low calcium milk is accomplished as follows:

As previously described, rennet, and most other milk clotting enzymes, have two actions on skim milk. The first, the milk clotting action, is the important reaction pertaining to the product being described. The second action, that of degrading the whole protein complex in milk, is not of importance. In fact, excessive protein degradation should be avoided.

Rennet is active in milk from a pH of 7.0 to 4.5. It becomes unstable at pH 4.5 or below. The maximum milk clotting activities occur in the upper area of this range and as the pH of the substrate is lowered, more general proteolitic activity occurs. Pepsin is active from pH 6.5 to pH 2.0. The proteolitic activity of pepsin becomes very strong as the pH of the substrate is decreased. Microbial derived enzymes such as is produced from *MUCOR MIEHEI* are active from pH 8.0 to 2.0. This enzyme has a higher ratio of proteolitic action compared to clotting action than rennet when the pH range of the substrate is shifted to the lower values. Enzymes derived from any one of several sources may be used; however, the choice should be made such that the milk clotting activity of the enzyme is high in relation to its general proteolitic degradation activity.

The preferred enzyme is Standardized Cheese Rennet Extract (Chr. Hansen's Laboratory, Inc.) with a substrate pH of 6.5.

The temperature range of rennet milk clotting activity is 5° C. to 55° C. The maximum activity of rennet occurs at about 40° C. and that is the preferred temperature for preparation of the milk product.

Lower pH values than 6.5 may be used; however, it was observed that when rennet action on low calcium skim milk occurred at pH 5.9, the manufactured milk product had a very slight cheese-like odor. It is practical and safe to choose the pH 6.5 point where there is a high clotting action by the rennet and a low protein breakdown effect compared to clotting action of the rennet. The preferred pH range is from about 6.0 to about 7.0.

Cheese rennet from the above source is available as a single strength standardized liquid product. The rennet is standardized from its variable strength raw material to require 3 fluid ounces of rennet liquid per 1000 pounds of milk for cheese manufacturing purposes. There appears to be little reason to use more or less than this ratio of rennet for the treatment of the low calcium skim milk substrate; however, it was determined that as little as 60% of the "3 ounce" ratio and as much as 5 times the recommended amount had little, if any, effect on the gel forming properties of the final product. The standardized single strength rennet extract is diluted with approximately 20 times its volume of water and the mixture added to the pH adjusted low calcium skim milk while rapidly agitating the milk. After thoroughly mixing the diluted rennet with the milk, agitation is continued as is necessary to maintain the desired reaction temperature.

Rennet acts on ordinary milk to form clots in as little as 8 minutes at a pH of 6.5 and at a temperature of 40° C. The total clot forming activity may or may not be complete with the first formation of clots in regular milk after 8 minutes of treatment. In circumstances where low calcium skim milk is treated with rennet, there is no visible means of determining the end of the clot action of rennet. No clots form when rennet is added to the low calcium milk. An arbitrary choice of 30 minutes treatment was employed as a matter of convenience and in appreciation of the mechanical problems of subsequently heating, holding and pumping large amounts of fluid products under practical manufacturing circumstances. The time of rennet treatment should be sufficient to alter the protein of the low calcium skim milk to effect the maximum potential gel formation in the final product.

It is important, at the end of the rennet treatment step, to inactivate the enzyme and stop its action on the milk protein. The temperature-time relationship used in the preparation of the milk product made and described herein was 60° C. for 30 minutes. Pepsin is inactivated at temperatures above 40° C. The above microbial enzyme requires temperatures above 80° C. for inactivation. It is common practice in the cheese industry to inactive rennet enzymes at 75° C. for 18–20 seconds by passing rennet containing products through high temperature—short time processors. The time-temperature combinations used to inactive the enzyme will depend upon the enzyme chosen. The enzyme manufacturer's recommendations for inactivation of his product should be followed.

these tests non-fat dry milk was also included as a potential calcium source.

The results of the tests were as follows:

| CALCIUM SOURCE AND AMOUNT AS MG. CA PER 100 ML. OF TREATED MILK SOLUTION* | (A) UPON ADDITIONS (20° C.) | (B) 4 HOURS AFTER ADDITIONS 20°–23° C. | (C) UPON HEATING 65°–70° C. for 15 minutes |
|---|---|---|---|
| None | Trans. soln. | Trans. soln. | Trans. soln. |
| Calcium Chloride** | | | |
| 100 mg. Ca | Trans. soln. | Trans. soln. | Gelled-White opaque-sl. soft |
| 125 mg. Ca | Trans. soln. | Trans. soln. | Gelled-white opaque-firm |
| 150 mg. Ca | Trans. soln. sl. haze | Trans. soln. sl. haze- sl. floc | Gelled-white opaque-firm sl. grainy |
| Calcium Lactate** | | | |
| 100 mg. Ca | Trans. soln. | Trans. soln. | Gelled-white opaque-soft |
| 125 mg. Ca | Trans. soln. | Trans. soln. | Gelled-white opaque-firm |
| 150 mg. Ca | Trans. soln. | Trans. soln. | Gelled-white firm-opaque |
| Nonfat Dry Milk 100 ml. containing 9 gms. NDM/ 100 ml. (approx. 60 mg. Ca) | Milky soln. | Milky soln. | Gelled-white opaque- smooth- soft body |

*Concentration of treated milk solution - 9 gm./100 ml. plus 4 gm. NaCl.
**Calcium salts added as a water solution.

Calcium lactate is the preferred source of calcium and the ratio of 125 mg. Ca per equivalent of 100 ml. of treated milk was chosen as being commercially practical for the manufacture of the sausage and meatball products. However, from the above it is evident that the range of calcium may vary from 100 mg. to 150 mg. per equivalent of 100 ml. of treated milk.

It should be noted that nonfat dry milk will also supply sufficient calcium to form a gel with rennet treated low calcium treated skim milk. Where it may be desired, a combination of the treated skim and nonfat dry milk can be used with some sacrifice in gel body strength.

Sodium chloride is a normal constituent of sausage formulations. The presence of salt has an effect on the gel forming properties of the treated milk as is shown below.

ACTIVATING CALCIUM CHOICE

The source of calcium used to form the gel with the treated milk product is limited by several conditions.

(1) It must be edible and acceptable as a formulated food product ingredient.

(2) It must not adversely contribute to the flavor of the compounded product.

(3) It should be soluble in water, available in commerce, and reasonable in cost.

The calcium content of milk is not constant. Feed differences, breed of animal, time of drawing the milk during lactation, climate and herd environment all affect the mineral content of milk. The following table will illustrate the variations in calcium content:

CALCIUM CONTENT—MG. PER 100 ML.

Average content: 120
Usual range: 100–140
Extremes: 65–264

Laboratory experiments were conducted to determine the relative reactivity of two potential sources of calcium, i.e. calcium chloride and calcium lactate. In

| | SALT* CONTENT AS % OF MILK SOLIDS | | |
|---|---|---|---|
| | 22% | 45% | 90% |
| Ca added as calcium lactate. 125 mg. Ca per 100 ml. 9% solids treated milk | Gelled very firm opaque | Gelled firm opaque | Gelled firm opaque - sl. softer than 45% salt |
| Ca added as calcium lactate. 125 mg. Ca per 100 ml. 9% solids treated milk (as CaCl₂) | Gelled very firm opaque. | Gelled firm opaque | Gelled firm opaque - sl. softer than 45% salt |

*Sodium chloride was dissolved in the treated milk solution prior to the addition of calcium lactate solution. Each of the mixtures was fully prepared then heated to 65°–70° C. for 15 minutes.

A concentrated solution of the milk product was prepared containing 29% total solids in which salt was dissolved at the above 90% ratio. 125 mg. of Ca as calcium lactate or as calcium chloride solution was added and the mixture heated to 65°–70° C. for 15 minutes. The mixtures gelled, were very firm and could be turned out of the mold intact.

The milk product can be used in varying amounts in sausage products. In connection with specific sausage products it can be used in amounts up to 3.5% of the final sausage weight. In connection with non-specific sausage products it can be added up to about 20% of the final sausage weight.

SAUSAGE PRODUCT FORMULATIONS

Cooked Comminuted Meat Products comprise a very wide variety of commercial sausage formulations. The potential number of formulations is almost endless. For purposes of illustrating the general principles to be used in the preparation of sausages, the following products were made and their physical properties evaluated.

| Frankfurters - Constituent ratios | |
|---|---|
| Pork (50% fat) | 50 pounds |
| Beef (25% fat) | 50 pounds |
| Corn Syrup Solids | 2 pounds |
| Milk Product* | 4.2 pounds |
| Salt | 1.6 pounds |
| Seasoning and Cures | 0.4 pounds |
| Water | 12.0 pounds |
| Calcium Lactate** | 0.4 pounds |

*Either (A) Nonfat dry milk or (B) Enzyme treated low calcium skim milk solids.
**Used only with enzyme treated low calcium skim milk solids.

PROCEDURE

All constituents were comminuted to a batter, stuffed into 20 mm diameter glass tubes, the bottom of the tubes closed with rubber stoppers and the tops closed with a cotton wool ball wrapped in aluminum foil. All tubes (4 each A and B) were placed in an agitated water bath at 40° C. and the bath heated at a rate to increase the internal temperature of the meat product to 70° C. in 15 minutes. The tubes were chilled to 15° C. placed in refrigeration and evaluated.

EVALUATION

| | A<br>Sausage w/ Nonfat<br>Dry Milk | B<br>Sausage w/ Enzyme<br>Treated Milk |
|---|---|---|
| In tube appearance | Approx. 5/16" fat on top of sausage | Approx. ⅛" fat |
| Sausage removed from tube | Fairly firm, small fat pockets in interior. Slightly tough on chewing. | Very firm. Noticeably firmer that (A). No fat pockets in interior. Tender on chewing. |

Those familiar with sausage making techniques will recognize that the formula is "net" and the cooking procedures more drastic than would be encountered in usual commercial practice. This was deliberate in order to stress the formulation.

MEATBALL PRODUCTS

Meatballs were prepared using the following procedures and formulations.

BATTER PREPARATION

| Ingredient | A<br>With<br>Nonfat Dry Milk | B<br>With<br>Treated Skim |
|---|---|---|
| Ground Pork (50% fat) | 100.0 gms. | 100.0 gms. |
| Nonfat Dry Milk | 16.8 gms. | None |
| Treated Skim product | None | 16.8 gms. |
| Salt | 8.0 gms. | 8.0 gms. |
| Water | 48.0 gms. | 48.0 gms. |

PROCEDURE

The above ingredients in each of the A and B formulations were placed in an Oster blender having resharpened blades and a chilled bowl and reduced to a smooth batter in exactly 30 seconds. 35 gms. of each batter formula was separately mixed with two 75 gm. amounts of double ground lean beef (25% fat). Each mixture was chilled in refrigeration for 20 minutes and made into four equal sized meatballs. Meatballs A were placed into 300 ml. of boiling water. The heat source was removed in exactly 15 minutes. Meatballs B were placed in 300 ml. of boiling water which contained 0.9 gms. of calcium lactate pentahydrate. The heat was removed in 15 minutes. The containers of the cooking medium and the cooked meatballs were allowed to cool to room temperature and refrigerated overnight. The following was observed:

MEATBALL EVALUATION

| Observation | Meatballs (A) | Meatballs (B) |
|---|---|---|
| Fat on surface of broth | 8.22 gms. | 5.60 gms. |
| Fat % as portion of (A) | 100.0% | 68% |
| Broth appearance | Cloudy | Relatively clear |
| Firmness of balls | Very firm. | Firm but tender |
| Appearance | Shrunken | Plump |
| Organoleptic property | Tough-rubbery | Firm, tender, pleasant |

The meatballs made with rennet treated low calcium skim milk solids cooked in water containing free calcium, rendered less fat, retained more moisture, had a better appearance, and were more pleasant to eat than those made with nonfat dry milk and cooked in water.

The same end result, the formation of a gel in sausage, as above described, can be obtained by other systems.

An article of commerce is a class of products called "dairy blends". The usual products are mixtures of an alkali salt of acid casein plus whey combined in a ratio to have the approximate analysis of nonfat dry milk. They are made by either dry mixing dried whey and a dried alkali salt of casein or by blending a caseinate solution with fluid whey; then drying the liquid to a powder. In some instances, the major constituent analysis—protein/milk sugar ratio—can be considerably different than that in skim milk. The end use requirements for the blends may dictate the analysis variation or the ratio of whey to caseinate may be deliberately high simply to lower the selling price.

The market price of a blend having the analysis of nonfat dry milk can cost as much as 40¢ per pound less than dry milk. The blends are coming into vogue because of the constantly increasing cost of nonfat dry milk. The government support price for nonfat dry milk is over 3 times that of 12-15 years ago. Blends are a means to utilize huge amounts of whey. Whey is a drug on the market, it is cheap and presents cheese makers with major problems. They can no longer dump whey into the streams.

When acid type cheeses or acid precipitated casein is made, the calcium of the milk is thrown into the whey. Low acid cheeses, or rennet casein, produce wheys that are low in calcium it is retained in the curd. Intermediate types of cheeses throw more or less calcium to the whey. All of these types of wheys are available today at prices from zero to 5¢ per pound solids.

The same end results as above described can be obtained by the following procedures:

METHOD 2 (A Blend)

(1) Dissolve acid casein in water with NaOH to a pH 6.5. At 40° C., react with casein solution with rennet. Inactivate the rennet at 60° C.
(2) Remove the calcium from fluid whey by cation exchange processing.
(3) Mix (1) and (2) in the desired ratio, condense and dry the mixture to a powder.

METHOD 3 (A blend)

(1) Dissolve acid casein in fluid whey, using NaOH for solution.
(2) Remove the calcium from the mixture by cation exchange processing.
(3) Treat (2) with rennet at pH 6.5 and 40° C.
(4) Inactivate the rennet at 60° C., condense and dry the fluid to a powder.

Each of these methods produces an end product which, when calcium lactate and heat are applied, will form gels in sausage as above described. The products of Method 2 and 3 are indistinguishable in final form from the product produced using fluid skim as the starting material.

METHOD 4 (Not a Blend)

(1) Dry the product of step (1) of Method 2 to a powder.
(2) Dissolve it in a sausage batter.
(3) Add a calcium source to the batter, i.e. calcium lactate, high calcium whey, nonfat dry milk, either alone, separately or in combination.
(4) Heat the batter mixture to form the gel within the sausage structure.

It is to be noted that the product of Method 4 is not a blend. it is a special highly reactive sodium caseinate which, with sufficient calcium from an appropriate source, forms the desired gel in sausage.

What is claimed is:

1. Sausage and meatball products comprising cooked comminuted meat and fat and a gel formed by the reaction during the cooking of said products of enzymatically activated sodium caseinate and calcium ion, said gel being in an amount sufficient to retain fat and moisture within the body of the cooked product.

2. The products of claim 1 wherein said sodium caseinate is obtained from skim milk which has been sodium for calcium exchanged to reduce the calcium content to from about 8 to about 70 mg./100 ml. and wherein the enzyme is rennet.

3. The products of claim 2 wherein the solids constituent of said skim milk is present to the extent of up to about 3.5% of finished sausage weight for specific sausage products and to the extent of up to about 20% of the finished sausage weight for non-specific sausage products.

4. A method of producing comminuted meat products comprising treating liquid skim milk to from about 8 to reduce the calcium content to about 70 mg./100 ml. by replacing calcium ion with sodium ion, thereafter adjusting the pH to the range of about 6.0–7.0, treating the skim milk with an enzymatic agent and thereafter inactivating said agent, concentrating and drying the skim milk to obtain enzyme activated sodium for calcium exchanged dried skim milk, forming a cooking mixture by compounding with comminuted meat an amount of said dried skim milk and an amount of a calcium ion source sufficient to react with the calcium sensitive protein of the enzyme activated sodium for calcium exchanged skim milk component of said mixture to form a gel within the mixture, and cooking said mixture.

5. Skim milk solids produced by drying fluid skim milk which has been sodium for calcium exchanged to reduce the calcium content to from about 8 to about 70 mg./100 ml. and thereafter enzymatically activated, whereby said solids are gellable upon the subsequent addition thereto of water, heat and calcium ion.

6. A method of producing comminuted meat products comprising treating sodium caseinate in aqueous solution with an enzymatic agent to form activated sodium caseinate and thereafter inactivating said agent, drying the solution of activated sodium caseinate to obtain enzyme activated dried sodium caseinate, forming a cooking mixture by compounding with comminuted meat an amount of said enzyme activated sodium caseinate and an amount of a calcium ion source sufficient to react with the calcium sensitive protein of the enzyme activated sodium caseinate component to form a gel within the mixture, and cooking said mixture.

7. A method of producing comminuted meat products comprising treating sodium caseinate in aqueous solution with an enzymatic agent to form activated sodium caseinate and thereafter inactivating said agent, drying the solution of activated sodium caseinate to obtain enzyme activated dried sodium caseinate, and forming a mixture by compounding with comminuted meat an amount of a calcium ion source sufficient to react with the calcium sensitive protein of the enzyme activated sodium caseinate component to form a gel within the mixture during the subsequent cooking of the mixture.

8. A mixture of comminuted meat, fat, enzymatically activated sodium caseinate and calcium ion, said sodium caseinate and calcium ion being reactable to form a gel during subsequent cooking of the mixture, said gel being in an amount sufficient to retain fat and moisture within the body of the subsequently cooked mixture.

9. Sodium caseinate produced by enzymatically activating sodium caseinate in the substantial absence of calcium, said sodium caseinate having the property of being gellable upon the addition thereto of heated water of 65°–75° C. and calcium ion, whereby the gellable sodium caseinate is capable of retaining fat and water in a food product.

* * * * *

UNITED STATES PATENT AND TRADEMARK OFFICE
CERTIFICATE OF CORRECTION

PATENT NO. : 4,202,907
DATED : May 13, 1980
INVENTOR(S) : Arthur E. Poarch

It is certified that error appears in the above—identified patent and that said Letters Patent is hereby corrected as shown below:

Column 1, line 47, "meatball" should read -- meatballs --.

Column 5, line 23, "roducts" should read -- products --.

Column 13, line 8, after "calcium" (a dash or hyphen) -- - -- should be inserted.

Column 13, line 17, after "react" the word "with" should be deleted and -- the -- should be inserted.

Column 14, line 6, Claim 4, after "to" -- reduce the calcium content to -- should be inserted.

Column 14, line 7, Claim 4, "reduce the calcium content to" should be deleted.

Signed and Sealed this

Twenty-ninth Day of July 1980

[SEAL]

Attest:

SIDNEY A. DIAMOND

Attesting Officer          Commissioner of Patents and Trademarl